US012749588B2

(12) United States Patent
Gerczak et al.

(10) Patent No.: US 12,749,588 B2
(45) Date of Patent: Sep. 29, 2026

(54) TRISO ARCHITECTURE FOR PALLADIUM AND SILICON CARBIDE INTERACTION MITIGATION

(71) Applicant: UT-Battelle, LLC, Oak Ridge, TN (US)

(72) Inventors: Tyler J. Gerczak, Oak Ridge, TN (US); John D. Hunn, Oak Ridge, TN (US); Richard A. Lowden, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 427 days.

(21) Appl. No.: 18/229,833

(22) Filed: Aug. 3, 2023

(65) Prior Publication Data

US 2024/0062925 A1 Feb. 22, 2024

Related U.S. Application Data

(60) Provisional application No. 63/406,318, filed on Sep. 14, 2022, provisional application No. 63/399,266, filed on Aug. 19, 2022.

(51) Int. Cl.
*G21C 3/62* (2006.01)
*G21C 21/14* (2006.01)

(52) U.S. Cl.
CPC ............. *G21C 21/14* (2013.01); *G21C 3/626* (2013.01)

(58) Field of Classification Search
CPC ...................................................... G21C 3/626
See application file for complete search history.

(56) References Cited

U.S. PATENT DOCUMENTS 3,298,921 A * 1/1967 Bokros ............... C04B 41/5001 976/DIG. 97
3,335,063 A * 8/1967 Goeddel .................. G21C 7/04 376/419

(Continued)

FOREIGN PATENT DOCUMENTS

GB 1366505 A * 9/1974 ............. G21C 3/626
KR 20180121789 A * 11/2018 ............... G21C 3/04

(Continued)

OTHER PUBLICATIONS

Gerczak, Tyler J., et al. "Development of Planar PyC/SiC Diffusion Couples to Investigate Irradiation Effects and Microstructural Variation on Fission Product Diffusion." 9th International Conference on High Temperature Reactor Technology (HTR2018). No. INIS-PL--23M0001. 2018. (Year: 2018).*

(Continued)

*Primary Examiner* — Lily C Garner
(74) *Attorney, Agent, or Firm* — WARNER NORCROSS + JUDD LLP

(57) ABSTRACT

A TRISO architecture including an improved buffer layer is provided. The improved buffer layer contains sacrificial silicon in low density carbon to react with palladium released from the kernel and thereby limit the palladium available to react with the existing SiC layer. The introduction of silicon in the buffer layer allows for longer fuel lifetimes and/or higher operating temperatures. Higher achievable burnups and operational temperatures can reduce fuel costs and achieve higher efficient power production. In addition, the silicon-containing buffer layer mitigates fuel failure from palladium corrosion, thereby increasing the safety of the TRISO fuel particle.

6 Claims, 7 Drawing Sheets

(56) References Cited

U.S. PATENT DOCUMENTS

| | | | | | |
|---|---|---|---|---|---|
| 3,361,638 | A * | 1/1968 | Bokros | C01B 32/00 | 252/639 |
| 3,649,452 | A * | 3/1972 | Chin et al. | C01B 32/00 | 252/639 |
| 3,650,896 | A * | 3/1972 | Goeddel | G21C 3/20 | 976/DIG. 97 |
| 3,798,123 | A * | 3/1974 | Lindemer | G21C 3/626 | 252/639 |
| 3,992,258 | A * | 11/1976 | Tobin | G21C 3/626 | 376/427 |
| 4,056,641 | A * | 11/1977 | Huschka | G21C 3/626 | 427/213 |
| 4,128,075 | A * | 12/1978 | Huschka | G21C 3/626 | 118/DIG. 5 |
| 4,262,039 | A * | 4/1981 | Gyarmati | C04B 41/009 | 427/213 |
| 4,267,019 | A * | 5/1981 | Kaae | G21C 3/626 | 976/DIG. 97 |
| 4,342,284 | A * | 8/1982 | Loser | C23C 16/442 | 118/716 |
| 9,378,851 | B2 * | 6/2016 | Kuczynski | G21C 3/626 | |
| 10,068,674 | B2 * | 9/2018 | Brothier | C23C 16/442 | |
| 2009/0129533 | A1 * | 5/2009 | Kuczynski | G21C 3/58 | 427/214 |
| 2011/0091004 | A1 * | 4/2011 | Farmer | G21B 1/01 | 376/412 |

FOREIGN PATENT DOCUMENTS

| | | | | |
|---|---|---|---|---|
| RU | 2603020 | C1 * | 11/2016 | C23C 16/32 |
| WO | WO-2005086173 | A2 * | 9/2005 | G21C 3/17 |

OTHER PUBLICATIONS

Gerczak, Tyler J., et al. Preparation of Diffusion Couples for Irradiation and High Temperature Testing of Representative TRISO PyC/SiC. No. ORNL/TM-2018/1012. Oak Ridge National Laboratory (ORNL), Oak Ridge, TN (United States), 2018. (Year: 2018).*

Huschka, H., and P. Vygen. "Coated fuel particles: requirements and status of fabrication technology." Nuclear technology 35.2 (1977): 238-245. (Year: 1977).*

Gerczak, Tyler J., et al. FY18Q1 Quarterly Report: Radiation Enhanced Diffusion of Ag, Ag-Pd, Eu, and Sr in Neutron Irradiated PyC/SiC Diffusion Couples. No. ORNL/TM-2018/766. Oak Ridge National Laboratory (ORNL), Oak Ridge, TN (United States), 2018. (Year: 2018).*

Gerczak, Tyler J., et al. FY18Q2 Quarterly Report: Radiation Enhanced Diffusion of Ag, Ag-Pd, Eu, and Sr in Neutron Irradiated PyC/SiC Diffusion Couples. No. ORNL/TM-2018/835. Oak Ridge National Laboratory (ORNL), Oak Ridge, TN (United States), 2018. (Year: 2018).*

RU-2300818-C1 (Year: 2007).*

RU-2368965-C1 (Year: 2009).*

RU-2328782-C1 (Year: 2008).*

WO-2017082772-A2 (Year: 2017).*

* cited by examiner

| Run ID | Temp. (°C) | Run Duration (min) | Fluidization (Ar, sccm) | Carbon Source ($C_2H_2$, sccm) | Silicon Source (5% $SiH_4$, 95% Ar, sccm) | Coating Gas Fraction |
|---|---|---|---|---|---|---|
| GCS 002 | 1351 | 5 | 1200 | 3600 | 1200 | 0.61 |
| GCS 001 | 1350 | 5 | 1800 | 3600 | 600 | 0.605 |
| GCS 004 | 1350 | 5 | 2100 | 3600 | 300 | 0.6 |
| GCS 005 | 1350 | 5 | 2280 | 3600 | 120 | 0.6 |
| GCS 007 | 1350 | 5 | 2400 | 3600 | 0 | 0.6 |

FIG. 3

| Run ID (# of Particles Analyzed) | Mean of Avg. Diam. (µm) | # of particles with Ellipticity ≥ 1.05 | Avg. Ellipticity | Mean Weight per Particle (g) | Mean Coating Thickness (µm) | Mean Buffer Density ($g/cm^3$) |
|---|---|---|---|---|---|---|
| GCS002 (349) | 711±54 | 20 | 1.035 | 4.990±0.211E-04 | 99.2±.28.5 | 0.558±0.2745 |
| GCS001 (329) | 749±24 | 14 | 1.031 | 5.594±0.169E-04 | 11.8±0.15 | 0.841±0.170 |
| GCS004 (186) | 860±103 | 10 | 1.030 | 6.834±0.635E-04 | 173.8±52.3 | 0.953±0.498 |
| GCS005 (358) | 719±30 | 13 | 1.030 | 5.667±0.096E-04 | 103.6±17.5 | 1.070±0.233 |
| GCS007 (358) | 721±26 | 27 | 1.033 | 5.414±0.138E-04 | 104.5±15.8 | 0.857±0.190 |
| $ZrO_2$-500 µm (946) | 512±18 | 1 | 1.021 | 4.334±0.031E-04 | | |

FIG. 4

TRISO ARCHITECTURE FOR PALLADIUM AND SILICON CARBIDE INTERACTION MITIGATION

CROSS-REFERENCE TO RELATED APPLICATIONS

This application claims the benefit of U.S. Provisional Application 63/399,266, filed Aug. 19, 2022, and U.S. Provisional Application 63/406,318, filed Sep. 14, 2022, the disclosures of which are hereby incorporated by reference in their entirety.

STATEMENT REGARDING FEDERALLY SPONSORED RESEARCH AND DEVELOPMENT

This invention was made with government support under Contract No. DE-AC05-000R22725 awarded by the U.S. Department of Energy. The government has certain rights in the invention.

FIELD OF THE INVENTION

The present invention relates to nuclear fuel parties including nuclear fuel cores or fuel kernels surrounded by fission product-retentive outer coatings.

BACKGROUND OF THE INVENTION

Tristructural isotropic (TRISO) coated particle fuel is a robust fuel form developed for high temperature gas-fueled reactors (HTGRs). TRISO fuels are also under consideration for advanced reactor fuel forms such as Fluoride-salt Cooled Reactors (FHRs) and microreactors. The TRISO particle itself is a composite. For HTGRs, the particular architecture traditionally consists a uranium oxide ($UO_2$) kernel or a multiphase $UO_2$ and uranium carbide kernel surrounded by successive isotropic layers. The isotropic layers, in order, include a porous buffer layer, a dense inner pyrolytic carbon layer, a silicon carbide (SiC) layer, and a dense outer pyrolytic carbon layer. The isotropic layers are deposited, uninterrupted, using fluidized bed chemical vapor deposition. Individual particles are then integrated into a final fuel form by overcoating with a graphitic matrix and compacting either into a right cylinder compact for prismatic core reactors or a spherical fuel element for pebble bed reactors.

Each isotropic layer provides specific functionality during fuel processing and operation. For example, the kernel provides fissile and fissionable material and retains fission products. The buffer attenuations fission product recoils, provides a plenum to accommodate fission gases, and accommodates kernel swelling. The inner pyrolytic carbon layer provides a gas-tight barrier to mitigate fission gas release and protects the kernel during SiC deposition. The SiC layer is a primary load bearing member and provides a barrier to the release of fission gases and metallic fission products not retained in the kernel during operation. Lastly, the outer pyrolytic carbon layer is a final gas-tight layer and provides a surface for overcoating.

Palladium and silver are of particular interest to TRISO fuel operation since they do not readily form stable oxides or carbides and are therefore readily released from the kernel and are free to interact with the SiC layer. However, the SiC layer is susceptible to corrosion by palladium and the penetration of palladium into the SiC layer. Corrosion of the SiC layer by palladium can occur locally around the circumferences of the interface between the SiC layer and the inner pyrolytic carbon layer. This local corrosion reduces the effectiveness of the SiC layer, and local disruptions in the SiC layer can lead to weakened SiC and increases its failure probability.

Accordingly, there remains a continued need for a system that limits the interaction of palladium SiC to thereby reduce TRISO failures and expand practical operating conditions.

SUMMARY OF THE INVENTION

A TRISO architecture including an improved buffer layer is provided. The improved buffer layer contains sacrificial silicon in low density carbon to react with palladium released from the kernel and thereby limit the palladium available to react with the existing SiC layer. The introduction of silicon in the buffer layer, or generally internal to the inner pyrolytic carbon layer, allows for longer fuel lifetimes and/or higher operating temperatures. Higher achievable burnups and operational temperatures can reduce fuel costs and achieve higher efficient power production. In addition, the buffer layer with silicon mitigates fuel failure from palladium corrosion, thereby increasing the safety of the TRISO fuel particle.

In one embodiment, a method for manufacturing a TRISO fuel particle includes the addition of silane or methylsilane gas during fluidized bed chemical vapor deposition in a carrier gas, for example argon gas, to form the buffer layer. The total silicon concentration in the buffer layer can vary depending on the burnup target and other performance goals such as ultimate temperature. The co-deposition of a homogenous carbon and silicon buffer layer does not add significant cost during fabrication and realizes a marked increase in fuel performance and safety. The TRISO fuel architecture of the present invention is well suited for Generation IV commercial reactors such as HTGRs and FHRs. The need for longer burnups for remote power generation or space power generation, where refueling is limited or not possible, makes the TRISO fuel architecture of the present invention an attractive option for micro-reactor designs.

These and other features and advantages of the present invention will become apparent from the following description of the invention, when viewed in accordance with the accompanying drawings and appended claims.

BRIEF DESCRIPTION OF THE DRAWINGS

FIG. 3 is a table illustrating general run conditions for a buffer layer having sacrificial silicon in low-density carbon.

FIG. 4 is a table illustrating properties of fuel particles based on shadow imaging and mass analysis.

DETAILED DESCRIPTION OF THE CURRENT EMBODIMENT

The present invention relates to a TRISO fuel particle and a method of manufacture. The TRISO fuel particle includes an improved buffer layer containing sacrificial silicon in low density carbon to react with palladium released from the kernel and thereby limit the palladium, and potentially silver, available to react with the silicon carbide layer. The TRISO fuel particle in accordance with one embodiment is discussed below, followed by a discussion of its method of manufacture. A working example follows, which is intended to be non-limiting.

Figure 1:
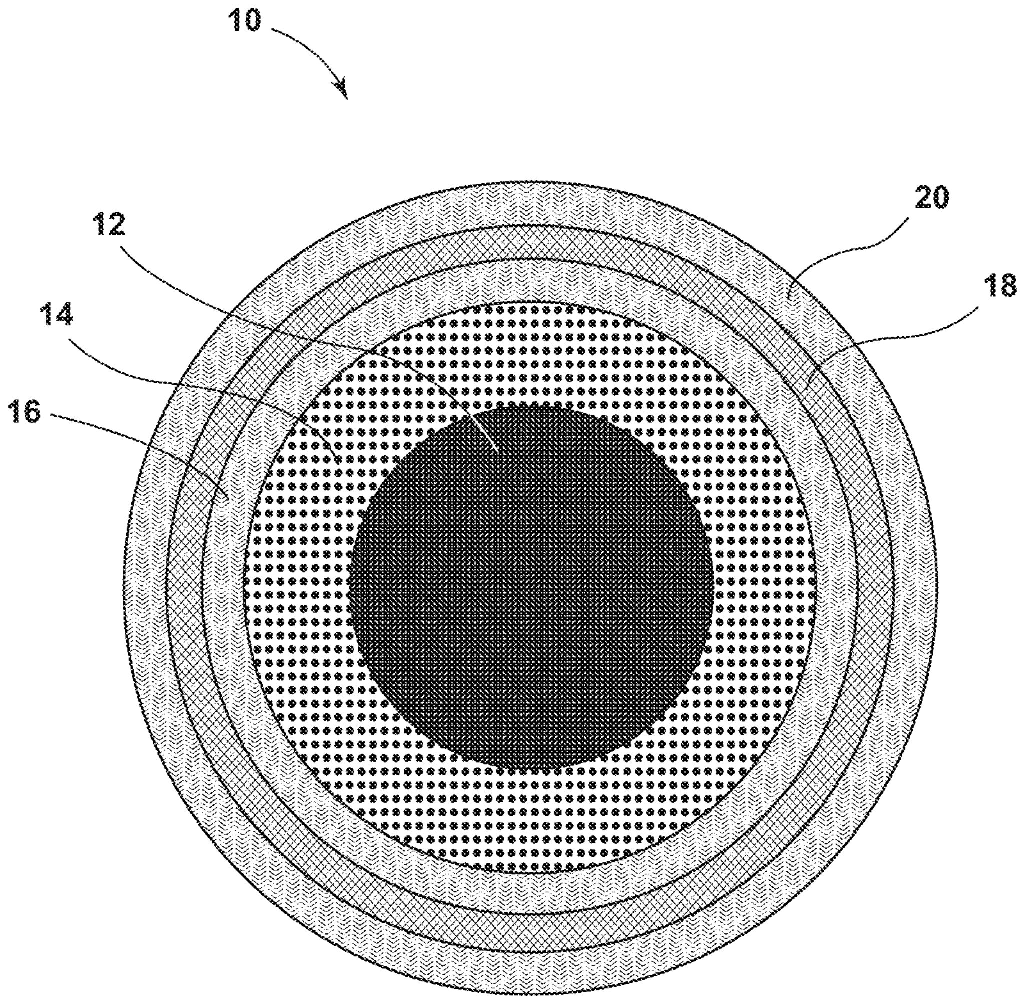
FIG. 1 is a cross-sectional view of a TRISO fuel particle in accordance with one embodiment of the present invention.

Referring first to FIG. 1, a TRISO fuel particle in accordance with one embodiment is illustrated and generally designated 10. The TRISO fuel particle 10 includes a fuel kernel 12 coated with four layers: a buffer layer 14, an inner pyrolytic carbon layer 16, a silicon carbide layer 18, and an outer pyrolytic carbon layer 20. The fuel kernel 12 can include uranium dioxide, uranium oxide, uranium carbide, or uranium nitride, by non-limiting example. The fuel kernel 12 is generally a spheroid between about 100 microns and about 500 microns in diameter, although larger spheroids may also be used in other embodiments.

The buffer layer 14 includes sacrificial silicon in low density carbon to react with palladium, prior to the palladium interacting with the silicon carbide layer 18, and thereby limiting the potential for silicon carbide corrosion. Secondarily, palladium silicides are believed to be a getter of silver. Silver released from the fuel kernel 12 forms a eutectic with silicon and may be soluble in silicon-bearing phases, thus limiting the mobile silver inventory at the silicon carbide layer 18. The buffer layer 14 defines a thickness of between 10 microns and 150 microns, inclusive, further optionally 10 microns to 20 microns inclusive, and defines a density of between 0.5 $gm/cm^3$ and 1.5 $g/cm^3$, inclusive (as used herein, "inclusive" means the upper and lower bounds are included in the stated range).

The inner pyrolytic carbon layer 16 protects the silicon carbon layer 18 by limiting the interaction between the silicon carbide layer 18 and the fuel kernel 12. The inner pyrolytic carbon layer 16 provides structural support to the silicon carbide layer 18 and serves as a diffusion barrier, preventing the release of fission products. The inner pyrolytic carbon layer 16 can have a thickness from 5 microns to 200 microns, inclusive, by non-limiting example, further optionally 5 microns to 10 microns, inclusive. This layer is optionally deposited from a mixture of acetylene and an inert gas, such as argon or helium, in a fluidized bed at an elevated temperature, for example 900° C. to 1800° C.

The silicon carbide layer 18 provides a robust physical barrier, with high thermal conductivity, to confine the fission products and prevent the release of radioactive materials. The silicon carbide layer 18 can include a thickness from 10 microns to 200 microns, inclusive, further optionally from 10 microns to 20 microns, inclusive. The silicon carbide layer 18 is functionally a containment shell to contain gaseous and metallic fission products. The thickness of the silicon carbide layer 18 is generally selected to withstand stress from the fission gases as they accumulate with the burning of the fuel kernel 12 as part of a high burn-up fuel cycle, thereby ensuring fission gases do not enter the coolant loop of a nuclear reactor.

The outer pyrolytic carbon layer 20 surrounds the silicon carbide layer 18 and provides a final barrier against the release of fission products. The outer pyrolytic carbon layer 20 can have a thickness from about 5 microns to about 200 microns, inclusive. This layer is optionally deposited from a mixture of acetylene and an inert gas, such as argon or helium, in a fluidized bed at an elevated temperature, for example 900° C. to 1800° C., by non-limiting example.

Figure 2:
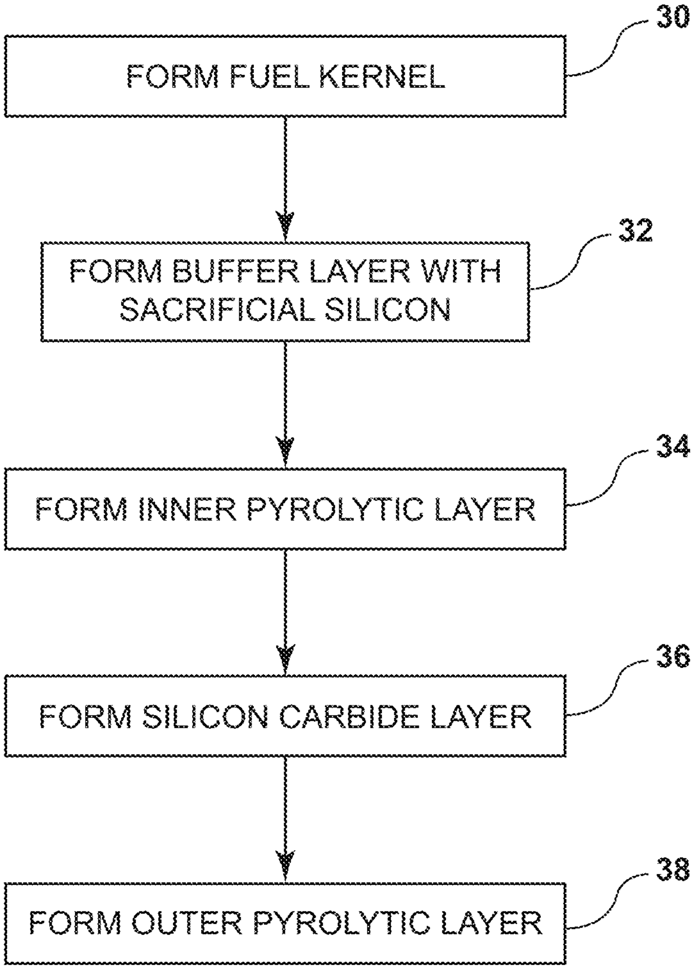
FIG. 2 is a flow-chart illustrating a method for manufacturing the TRISO fuel particle of FIG. 1.

In another embodiment, a method of manufacture is provided. With reference to the flow chart of FIG. 2, the method includes forming a fuel kernel, forming a buffer layer containing sacrificial silicon surrounding the fuel kernel, forming an inner pyrolytic carbon layer surrounding the buffer layer, forming a silicon carbide layer surrounding the first pyrolytic carbon layer, and forming an outer pyrolytic carbon layer surrounding the silicon carbide layer. Forming the fuel kernel is shown as step 30 and includes preparing the fuel kernel according to any suitable method, for example sol-gel methods. Multiple fuel kernels are then loaded into a fluidized bed chemical vapor deposition chamber. At step 32, the buffer layer is formed on the fuel kernel. As noted above, the buffer layer includes sacrificial silicon and is formed by co-depositing silicon with carbon. The fuel kernel is fluidized within argon (or other inert gas) and coating gases, including for example a silicon precursor gas and a carbon precursor gas. By non-limiting example, the silicon precursor gas can include silane ($SiH_4$), and the carbon precursor gas can include acetylene ($C_2H_2$). In still other embodiments, a single precursor gas containing both carbon and silicon can be used, for example methylsilane ($CH_6Si$). The temperature in the chamber is elevated for a minimum time period, for example at least 1300° C. for at least 5 minutes. The precursor gas does not include a halogen precursor, such as methyltrichlorosilane (MTS), which would otherwise yield an acid that is harmful to the fuel kernel.

After the buffer layer is formed, a carbon precursor gas, such as methane ($CH_4$) or acetylene ($C_2H_2$), and an inert gas, such as argon or helium, is introduced into the fluidized bed chemical vapor deposition chamber at step 34. The chamber is heated to high temperatures, for example 900° C. to 1800° C., by non-limiting example. At these elevated temperatures, the carbon precursor dissociates and releases carbon atoms, which deposit onto the surface of the buffer layer until a desired thickness and uniformity is achieved. At step 36, the silicon carbide layer is formed on the inner pyrolytic layer. This step includes introducing a suitable precursor gas into the fluidized bed chemical vapor deposition chamber. The precursor gas can include a halogen precursor, such as MTS. The deposition chamber is then heated at elevated temperatures, for example up to 1800° C., causing the precursor gas to decompose. The released silicon and carbon atoms react with each other, forming a silicon carbide deposition on the surface of the inner pyrolytic layer. The resulting silicon carbide layer provides mechanical strength, a diffusion barrier, and appropriate thermal conductivity.

At step 38, the outer pyrolytic layer is formed. This step includes introducing a carbon precursor gas, such as methane ($CH_4$) or acetylene ($C_2H_2$), and an inert gas, such as argon or helium, into the fluidized bed chemical vapor deposition chamber. The chamber is heated to elevated temperatures, for example 900° C. to 1800° C., by non-limiting example. At these elevated temperatures, the carbon precursor dissociates and releases carbon atoms, which deposit onto the surface of the silicon carbide layer until a desired thickness and uniformity is achieved. This outer layer is a final gas-tight layer and provides a surface for overcoating, if desired.

The following working example is provided for clarity and is intended to be non-limiting. A buffer coating having sacrificial silicon was directly deposited onto zirconium dioxide ($ZrO_2$) kernels, which were a surrogate for uranium-bearing fuel kernels. The particles were fluidized within argon and coating gases of acetylene and silane were introduced to facilitate deposition of the buffer layer. FIG. 3 displays the coating runs, which included a control buffer layer lacking sacrificial carbon. The total gas flow, run duration, and temperature were held constant, and the coating gas fraction was held essentially constant. Coated particles were then characterized to determine the distribution of silicon in the buffer layer and the uniformity of the buffer layer. FIG. 4 depicts the properties of the coated particles based on mean particle weight. The mean buffer thickness was determined by measuring the diameter of the coated particle and subtracting the measured diameter of the bare kernel. The mean buffer thickness values ranged from 99.2 microns to 118.5 microns, with one outlier (GC004) at 173.8 microns. With respect to ellipticity, the bare kernels had an average ellipticity of 1.021, and the coated kernels had an ellipticity in the range of 1.030 to 1.035, suggesting a uniform coating was deposited. Buffer densities ranged from 0.558 g/$cm^3$ to 1.070 gm/$cm^3$. The buffer densities, excluding GCS002, reflect buffer densities akin to traditional buffers.

Figure 5:
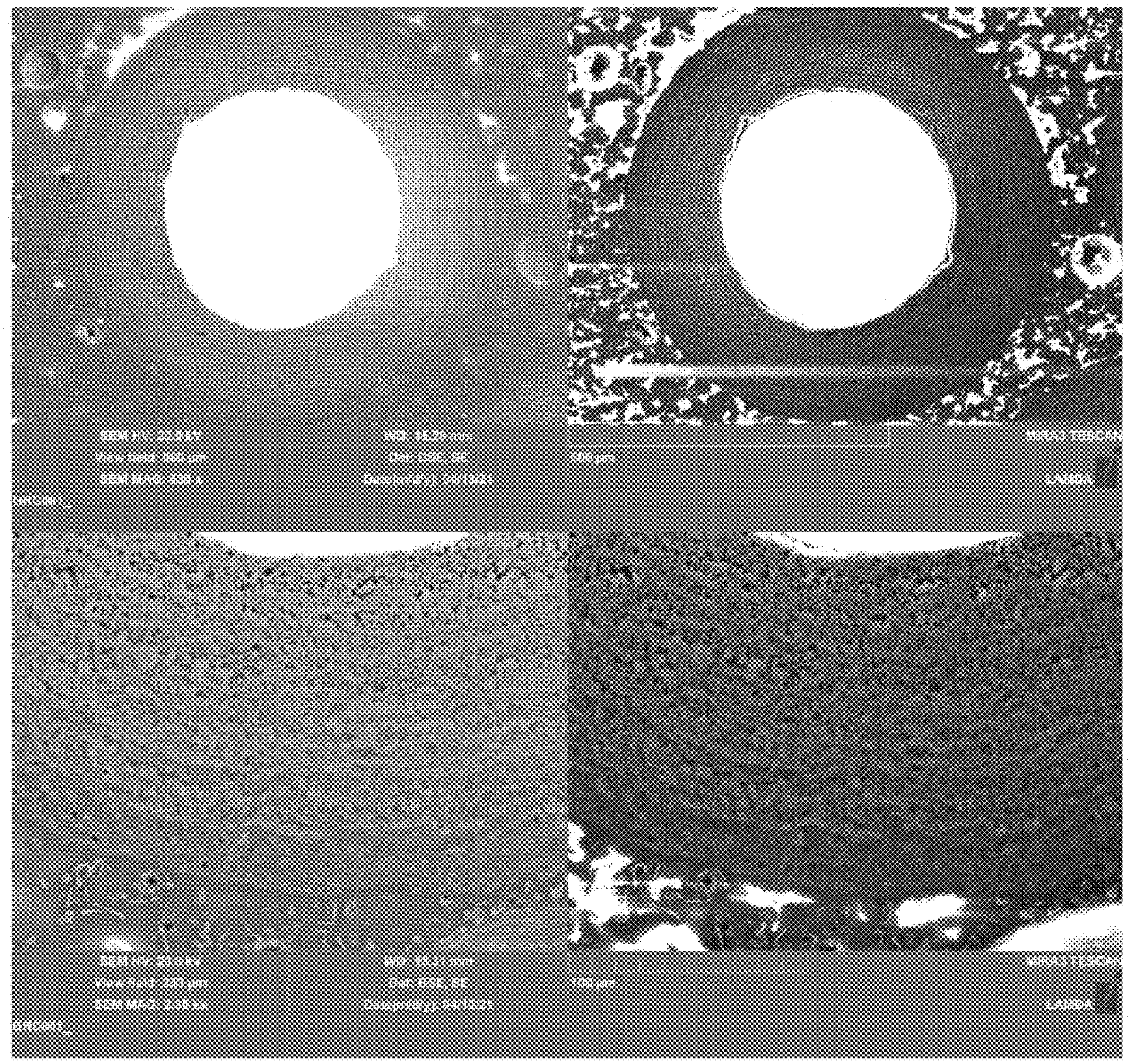
FIG. 5 includes scanning electron microscopy (SEM) micrographs of the 600 sccm silicon source buffer layer to depict layer morphology.
Figure 6:
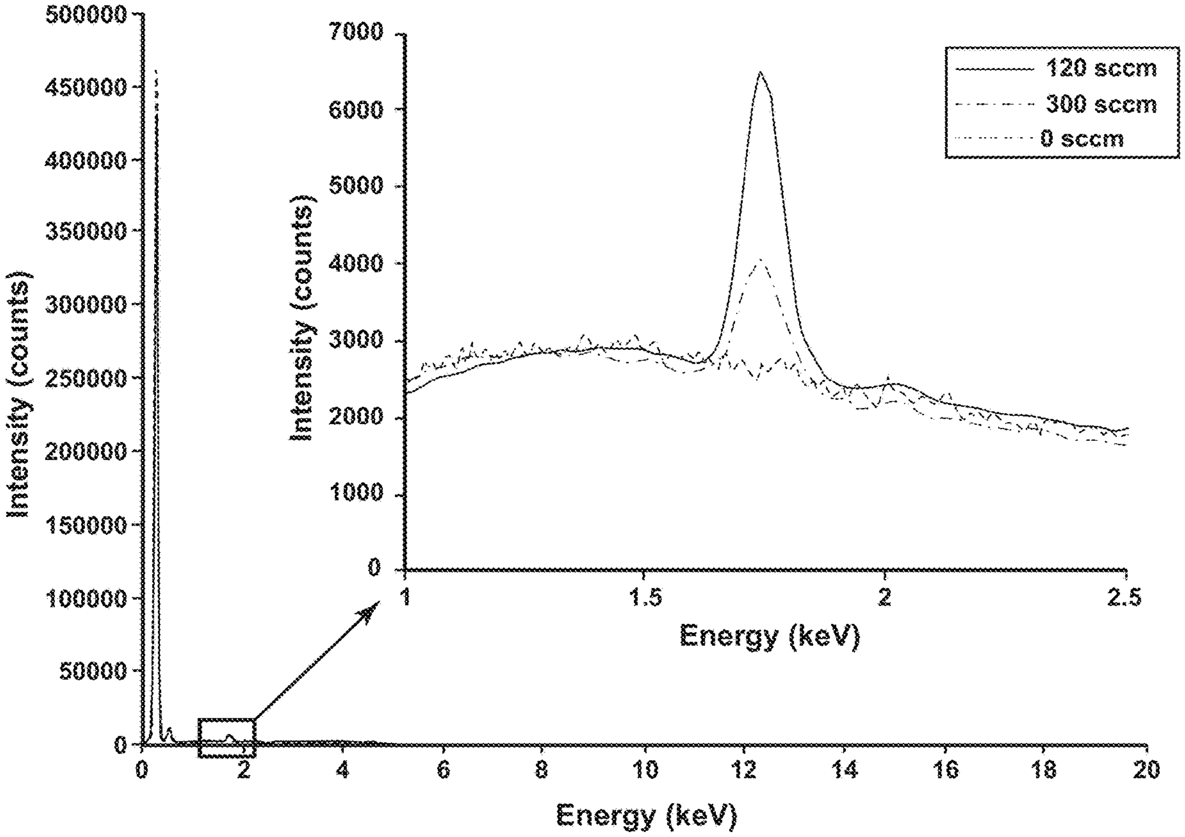
FIG. 6 is an energy dispersive x-ray spectroscopy (EDS) spectra of 120 and 300 sccm silicon source examples as compared to a standard buffer, with the silicon Kα1 intensity in the inset.
Figure 7:
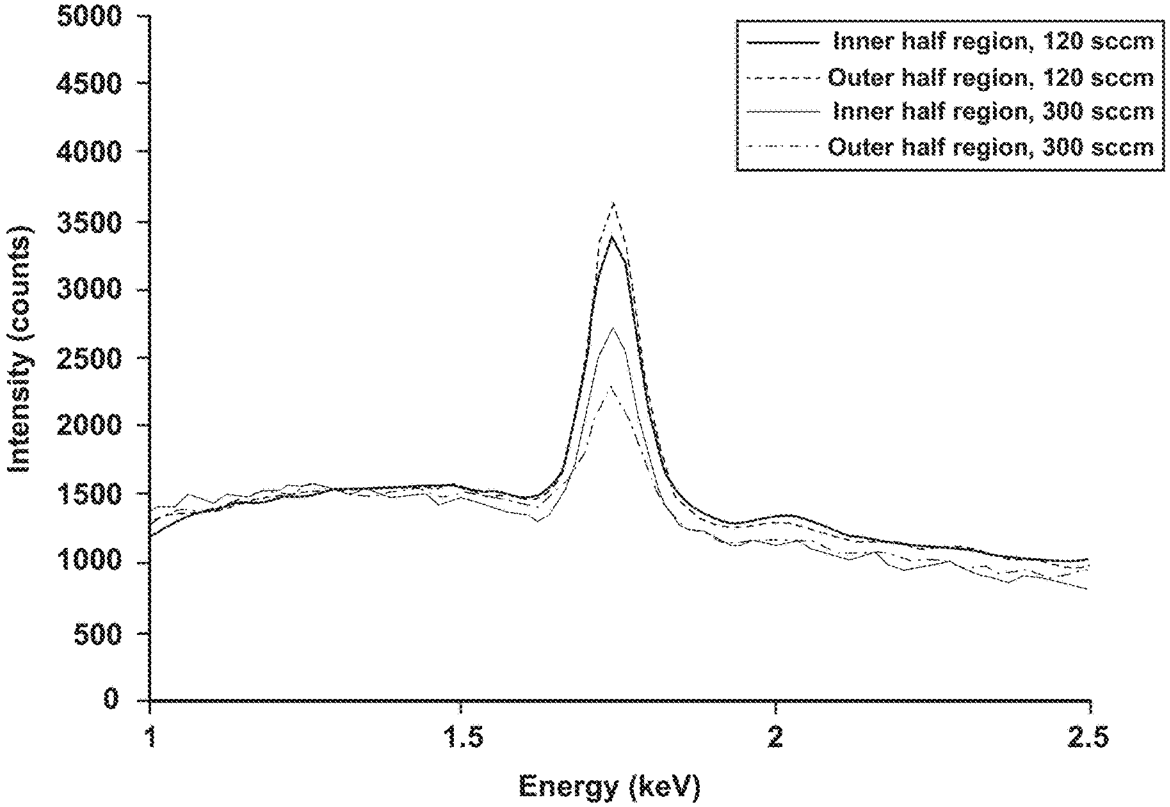
FIG. 7 is a comparison of the silicon Kα1 intensity at different regions in the buffer layer for 120 and 300 sccm conditions.

Optical imaging and scanning electron microscopy was conducted to explore the morphology and silicon distribution. FIG. 5 shows SEM micrographs of representative particle cross-sections from the 600 sccm argon and silane run (GCS001). The micrograph shows a uniform coating around the circumference of the particle. Compositional analysis of the buffer layer with energy dispersive spectroscopy (EDS) revealed the presence of silicon in the buffer layer. The higher silicon concentration was associated with an increasing argon and silane gas fraction. The EDS spectra of 120 sccm and 300 sccm silicon source (silane) is shown in FIG. 6, with silicon $K\alpha 1$ intensity highlighted in the inset. From FIG. 5, the buffer appeared denser at the kernel interface, with increasing porosity moving out radially. The density variation did not correlate with changes in silicon concentration, as shown in FIG. 7.

The foregoing example illustrates that co-deposited buffer layers can maintain similar properties, and most showed a uniform distribution of silicon. The presence of silicon in the buffer layer is available to interact with palladium, and possibly silver, released from the fuel kernel, mitigating deleterious palladium and silicon carbide interactions and fission product release. This co-deposition approach demonstrates the ability to deposit standalone silicon-bearing layers on a kernel without the introduction of harmful reaction byproducts, for example HCl, while increasing the operational envelope of traditional TRISO fuel architectures.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles “a,” “an,” “the,” or “said,” is not to be construed as limiting the element to the singular.

The invention claimed is:

1. A method of manufacturing a fuel particle, the method comprising:

forming a fuel kernel including uranium dioxide, uranium oxide, uranium carbide, or uranium nitride, such that the fuel kernel releases palladium fission products;

forming a buffer layer surrounding the fuel kernel;

forming a first pyrolytic carbon layer surrounding the buffer layer;

forming a silicon carbide layer surrounding the first pyrolytic carbon layer;

forming a second pyrolytic carbon layer surrounding the silicon carbide layer;

wherein forming the buffer layer includes fluidizing the fuel kernel in a fluidized bed chemical vapor deposition chamber with a precursor gas mixture containing silane ($SiH_4$), acetylene ($C_2H_2$), and a carrier gas, such that silicon from the silane and carbon from the acetylene are co-deposited onto the fuel kernel, the buffer layer having a density of 0.5 gm/$cm^3$ to 1.5 g/$cm^3$, wherein the silicon within the buffer layer reacts with the palladium fission products to limit the interaction of the palladium fission products with the silicon carbide layer.

2. The method of claim 1, wherein the buffer layer defines a thickness of between 10 microns and 150 microns, inclusive.

3. The method of claim 1, wherein forming the first pyrolytic layer includes introducing a carbon precursor in the fluidized bed chemical vapor deposition chamber at a temperature of between 900° C. and 1800° C., inclusive.

4. The method of claim 1, wherein forming the silicon carbide layer includes introducing a halogen precursor into the fluidized bed chemical vapor deposition chamber.

5. The method of claim 4, wherein the halogen precursor includes methyltrichlorosilane.

6. The method of claim 1, wherein forming the second pyrolytic layer includes introducing a carbon precursor in the fluidized bed chemical vapor deposition chamber at a temperature of between 900° C. and 1800° C., inclusive.

* * * * *